United States Patent [19]

Wurzburg et al.

[11] Patent Number: 4,689,788
[45] Date of Patent: Aug. 25, 1987

[54] METHOD AND APPARATUS FOR IMPLEMENTING A COST EFFICIENT VOICE/DATA COMMUNICATION SYSTEM WITH A CONVENTIONAL PBX SWITCH

[75] Inventors: Henry Wurzburg; Stephen H. Kelley; Noel M. McCroskey, all of Austin, Tex.

[73] Assignee: Motorola, Inc., Schaumburg, Ill.

[21] Appl. No.: 795,140

[22] Filed: Nov. 4, 1985

[51] Int. Cl.[4] ................................................. H04J 3/12
[52] U.S. Cl. .................................... 370/110.1; 370/67
[58] Field of Search .................. 370/110.1, 67, 85, 86; 179/2 DP; 379/93, 94

[56] References Cited

U.S. PATENT DOCUMENTS 4,381,427  4/1983  Cheal et al. ...................... 370/110.1
4,466,095  8/1984  Kawano et al. .................. 370/110.1
4,584,680  4/1986  Carter et al. ........................... 370/67

Primary Examiner—Douglas W. Olms
Attorney, Agent, or Firm—John A. Fisher; Jeffrey Van Myers; Robert L. King

[57] ABSTRACT

A method of providing simultaneous voice and data communication for multiple ports in a digital line card of a PBX is provided. In one form, 64 K baud non-blocking voice communication for seven coupled ports and simultaneous 9.6 K baud user data communication for each port may be implemented in a single conventional line card. Voice and data bits are transmitted in frames comprising thirty-two time slots. Data bits from the various user ports are multiplexed into a single eight bit time slot. Voice bits for each port are transmitted in eight bit time slots. In one form, each time frame comprises four time slots for data and twenty-eight time slots for voice.

4 Claims, 8 Drawing Figures

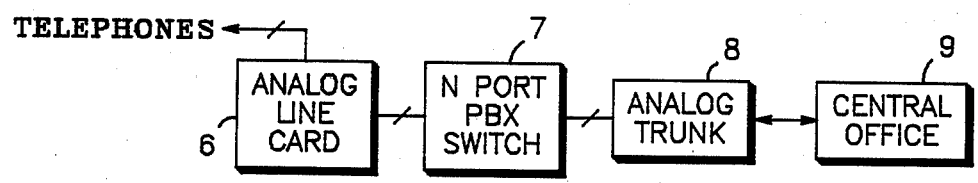
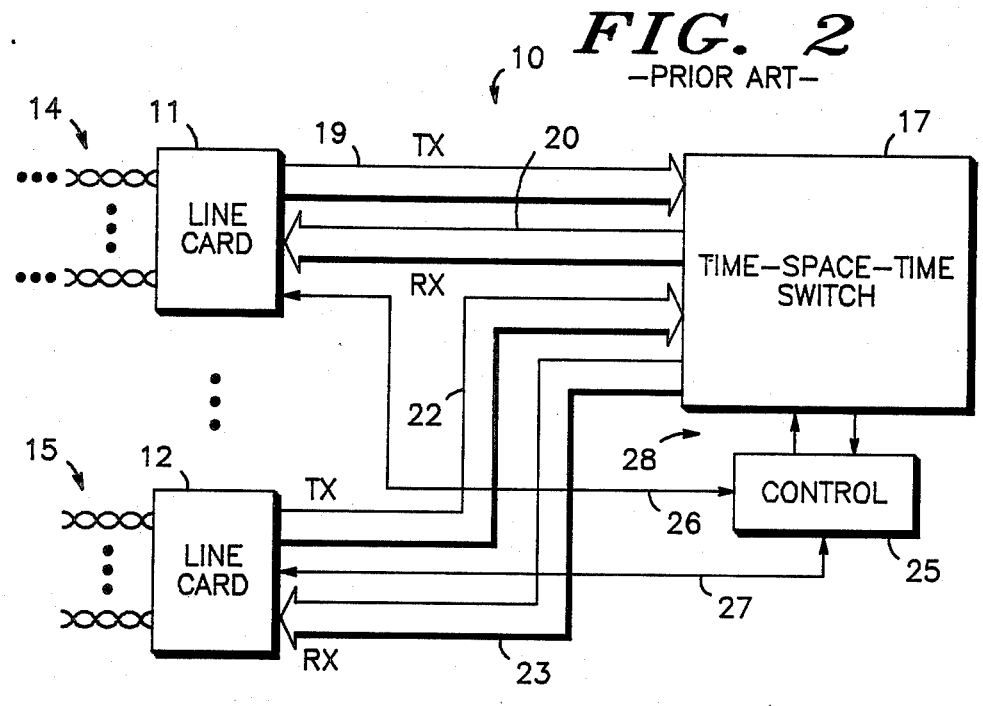
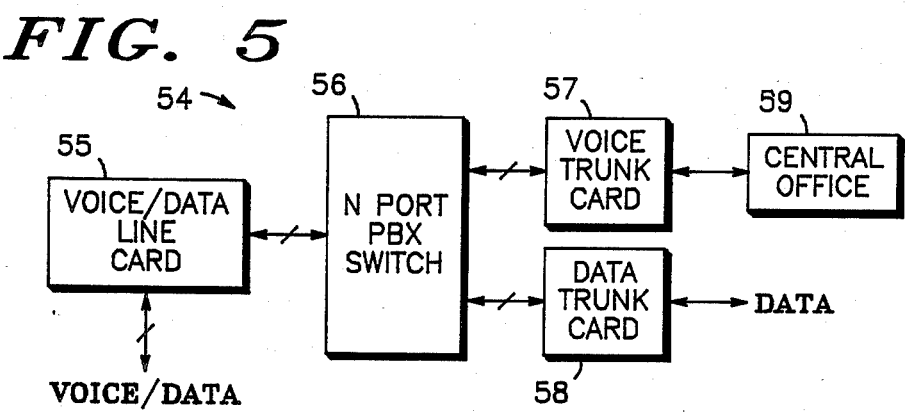

METHOD AND APPARATUS FOR IMPLEMENTING A COST EFFICIENT VOICE/DATA COMMUNICATION SYSTEM WITH A CONVENTIONAL PBX SWITCH

TECHNICAL FIELD

This invention relates generally to digital telecommunication systems, and more particularly, to voice/data telecommunication systems utilizing conventional PBX switching circuitry.

BACKGROUND ART

Switches in a PBX are typically characterized on a cost per line basis. The capacity of a switch is determined by the number of time slots in a frame which the switch is capable of handling. To provide both voice and data services in communications utilizing an existing PBX, two time slots were typically dedicated for voice and data transmission, respectively, so that the voice and data may be routed to two different destinations or receivers if desired. The disadvantage with this technique is that the number of possible subscribers which may be coupled to a PBX for voice and data service is reduced by one-half of the number of voice only subscribers. Further, the effective cost per line to provide data services with voice is therefore doubled. Auxillary switches may be added to an existing PBX to provide a data service and a voice/data service. However, additional control circuitry must also be added to control the auxillary switches and extensive modification of the existing conventional PBX design is typically required. Others have used a simultaneous voice and data transmission technique in a single time slot which does not reduce the line capacity of a PBX. However, both the voice and data must be routed to the same destination. In office environments such as a local area network, LAN, directing data and voice to separate locations such as to a telephone receiver and to a central word processor is typically required. Therefore, use of a single time slot which transmits both voice and data requires additional circuitry to implement a LAN with existing PBX equipment.

BRIEF DESCRIPTION OF THE INVENTION

Accordingly, an object of the present invention is to provide an improved voice and data switch architecture.

Another object of the present invention is to provide an improved cost efficient simultaneous voice and data communication system utilizing a conventional PBX.

A further object of the present invention is to provide a digital communication system having improved line capacity.

In carrying out the above and other objects of the present invention, there is provided, in one form, a method and a circuit for switching simultaneous voice and data transmissions in a communication system. A plurality of transceivers is provided with each transceiver being coupled between a subscriber line and a communication bus and having a first terminal for transmitting and receiving voice information to and from, respectively, the communication bus. Each transceiver also has a second terminal for communicating data information. A plurality of voice multiplexers is also provided with each voice multiplexer selectively communicating voice information between a predetermined one of the transceivers and the communication bus in predetermined time slots of a time frame. A data multiplexer is coupled to the second terminal of each transceiver, for selectively multiplexing data bits into a single time slot and communicating each data bit between the communication bus and a predetermined one of the transceivers. Control circuitry is coupled to the transceivers, voice multiplexers and data multiplexer, for controlling the transfer of voice and data information between each transceiver and the communication bus.

These and other objects, features and advantages will be more clearly understood from the following detailed description taken in conjunction with the accompanying drawings.

BRIEF DESCRIPTION OF THE DRAWINGS

FIG. 1 illustrates in block diagram form a conventional telephone communication system;

FIG. 2 illustrates in block diagram form a conventional digital telephone switch interfacing with analog line cards;

FIG. 5 illustrates in block diagram form a telephone communication system in accordance with the present invention;

DETAILED DESCRIPTION OF THE INVENTION

Figure 3:
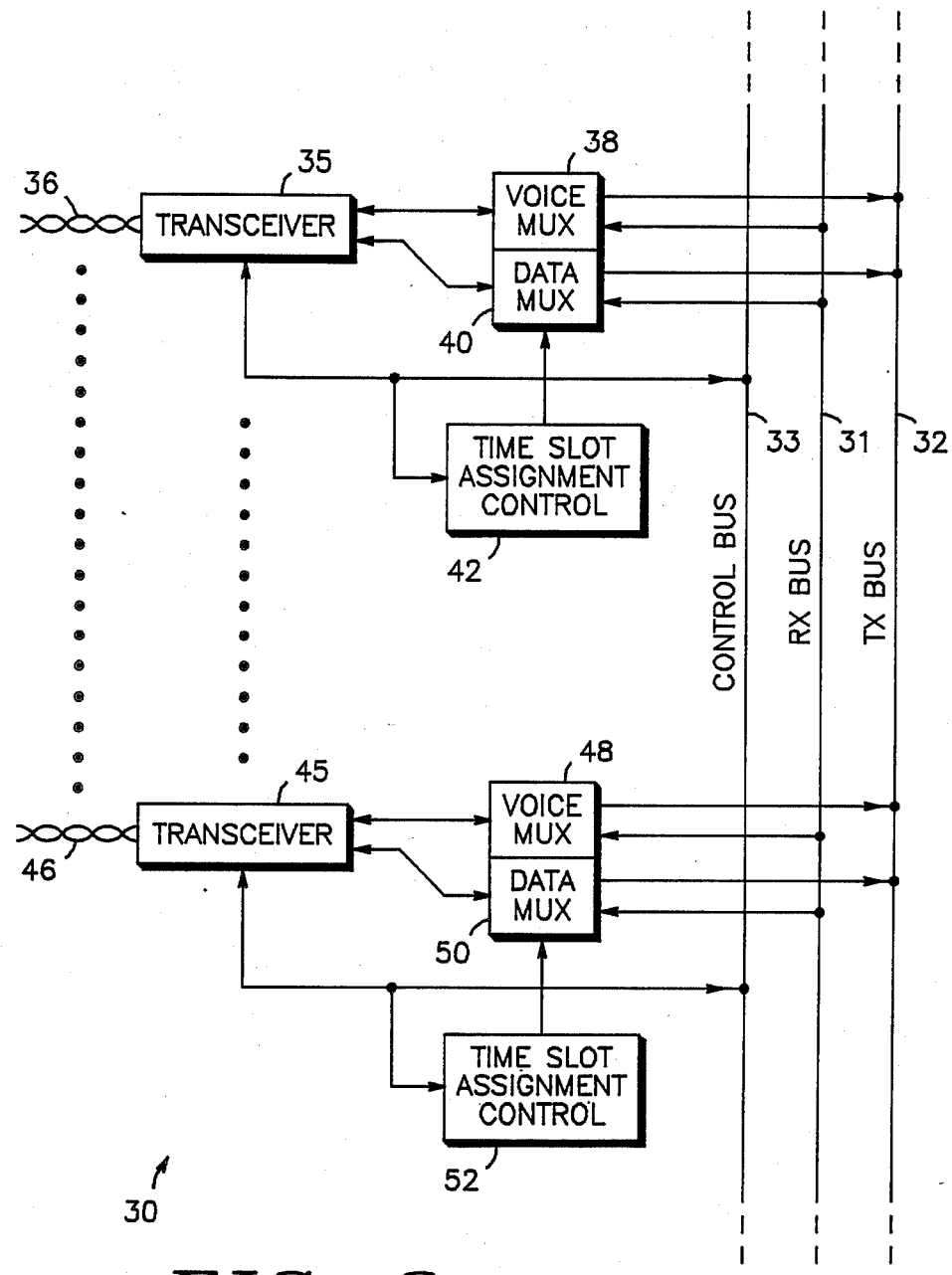
FIG. 3 illustrates in block diagram form a conventional voice/data line card.

Shown in FIG. 1 is a conventional telephone system 5. A plurality of telephones are coupled to an analog line card 6 via a set of multiple conductors. Analog line card 6 is coupled to an N-port PBX switch 7, where N is an integer, via multiple conductors. Switch 7 is coupled to an analog trunk 8 which is coupled to a central office 9.

Telephone system 5 may operate with analog line card 6 interfacing with N telephones which each may communicate voice information only to central office 9 and which may receive voice information only. Another implementation of telephone system 5 is to add data communication and provide simultaneous voice and data communication. However, to insure non-blocking operation, a separate communication channel must exist for each data channel added. Therefore, only (N/2) communication channels may exist for telephone voice communication if each telephone also has a data channel associated therewith without modifying the channel capacity of switch 7.

Shown in FIG. 2 is a conventional digital pulse code modulation (PCM) telephone switch architecture 10. A plurality of line cards shown in part as line cards 11 and 12 each has a predetermined number of telephone lines or ports illustrated as 14 and 15, respectively. Each port interfaces with a telephone set (not shown). A time-space-time switch 17 selectively interfaces with each of the plurality of line cards. A transmit (Tx) time division multiplexed data bus 19 is connected between a transmit terminal of line card 11 and a first data input terminal of switch 17. A receive (Rx) time division multiplexed data bus 20 is connected between a first data output terminal of switch 17 and a receive terminal of line card 11. A transmit (Tx) time division multiplexed data bus 22 is connected between a transmit terminal of line card 12 and a second data input terminal of switch 17. A receive (Rx) time division multiplexed data bus 23 is connected between a second data output terminal of switch 17 and a receive terminal of line card 12. Other line cards not shown may be interfaced with switch 17 in an analogous manner. Control circuitry 25 is connected to line cards 11 and 12 via control lines 26 and 27, respectively, and to switch 17 via control lines 28.

In operation, line cards 11 and 12 interface with a user's telephone set via words of eight bits each which are typically transmitted in 125 microsecond frames or time slots. Switch 17 functions to properly route telephone calls transmitted in eight bit words between various line card ports in response to control circuit 25. Control circuit 25 establishes and regulates connections made through switch 17. A common feature required of PBX networks is to enable every user in the system to be able to communicate to another user simultaneously so that every user may talk to another at the same time. Therefore, the PBX must be designed so that there are as many eight bit time slots for transmit and receive on the time duplex multiplexed data busses as there are user ports in a line card such as line card 11. For example, a system with thirty-two user ports coupled to a line card must utilize thirty-two transmit and thirty-two receive time slots on the switched buses such as buses 19 or 20. Otherwise, the potential for blocked call operation exists.

Communication systems which utilize simultaneous voice and data transmissions are commonly found. Such systems are typically desired to be implemented with existing PBX structures. However, if additional data such as user data in a voice/data telephone set system is required to be processed through switch 17, additional data bus capacity is required to handle the data in order to guarantee no blocked call operation. To obtain additional data bus capacity, auxillary data switches must be provided which requires extensive modification of the existing PBX. In contrast, if the additional data is processed thru an existing switch, fewer users may be coupled to the switch in order to maintain no blocked call operation. An important result of this fact is that the effective cost per user line is substantially increased to provide the simultaneous voice/data user feature.

Shown in FIG. 3 is a conventional n port line card 30, where n is an integer. Line card 30 interfaces with user telephone sets (not shown) and with a receive time duplex multiplexed PCM data bus 31, a transmit time duplex multiplexed PCM data bus 32, and a control bus 33. A line interface circuit or transceiver 35 is connected to a first pair of subscriber lines 36 which is coupled to a telephone set (not shown). A voice terminal of transceiver 35 is connected to a first terminal of a voice word multiplexer circuit 38. A second terminal of multiplexer 38 is connected to transmit bus 32, and a third terminal of multiplexer 38 is connected to receive bus 31. A data terminal of transceiver 35 is connected to a first terminal of a data word multiplexer circuit 40. A second terminal of multiplexer 40 is connected to transmit bus 32, and a third terminal of multiplexer 40 is connected to receive bus 31. Control bus 33 is connected to both a control terminal of transceiver 35 and a control input of a time slot assignment control circuit 42. An output of time slot assignment control circuit 42 is connected to a fourth terminal of data multiplexer 40. A line interface circuit or transceiver 45 is connected to a first pair of subscriber lines 46. A voice terminal of transceiver 45 is connected to a first terminal of a voice word multiplexer circuit 48. A second terminal of voice multiplexer 48 is connected to transmit bus 32, and a third terminal of voice multiplexer 48 is connected to receive bus 31. A data terminal of transceiver 45 is connected to a first terminal of a data multiplexer circuit 50. A second terminal of multiplexer 50 is connected to transmit bus 32, and a third terminal of multiplexer 50 is connected to receive bus 31. Control bus 33 is connected to both a control terminal of transceiver 45 and a control input of a time slot assignment control circuit 52. An output of time slot assignment control circuit 52 is connected to a fourth terminal of data multiplexer 50.

Figure 4:
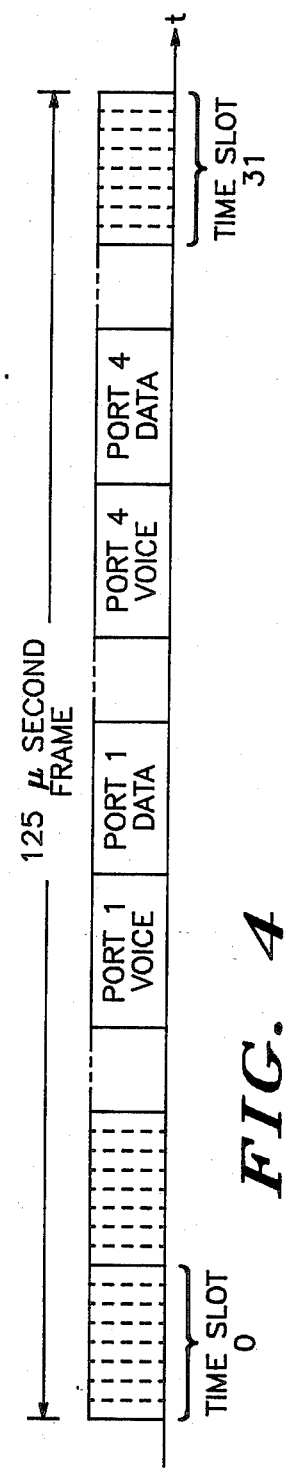
FIG. 4 illustrates in graphical form time slot assignment for the line card of FIG. 3.

In operation, each user which is coupled to line card 30 for voice and data operation must use both a voice multiplexer circuit such as multiplexer 38 and a data multiplexer circuit such as multiplexer 40 to selectively couple voice and data to transmit bus 32. An example frame of voice/data transmission operation for line card 30 is illustrated in FIG. 4 assuming line card 30 has four subscriber lines coupled thereto. In the illustrated form, data and voice are both transmitted and received in a 125 microsecond frame having thirty-two time slots. This frame length translates into a frequency of 64K bits/second (64K baud) which is a conventional PBX operating frequency. As shown by the first time slot labeled "0" of the frame of FIG. 4, each time slot is further divided into eight bit periods. If line card 30 has four transceiver circuits coupled to four subscriber lines or ports, eight time slots are required to transmit both voice and data for each of the ports. Each of these time slots contains either eight bits of data information or eight bits of voice information.

Shown in FIG. 5 is a voice/data communication system 54 in accordance with the present invention. A voice/data line card 55 is coupled to a plurality of voice and data terminals (not shown) via a multiple wire conductor. Line card 55 is connected to a conventional N port PBX switch 56, where N is an integer, via a bidirectional multiple wire conductor. Switch 56 is also connected via bidirectional multiple wire conductors to a voice trunk card 57 and to a data trunk card 58. Voice trunk card 57 is coupled to a central office 59 which receives and properly routes all telephone calls.

In operation, system 54 provides efficient voice and data communication using an existing PBX switch such as switch 56. An advantage of the present invention is that the invention may be used directly with existing telephone systems having voice only capability without modification of an existing PBX switch. Conversion of these systems to voice and data systems has previously required either substantial modification of the PBX or has resulted in a significant reduction of channel capacity. The present invention however provides the ability to use an existing PBX switch and connect line card 55 and trunk card 58 thereto to provide simultaneous voice and data communication without a significant reduction in channel capacity of the system.

Figure 6:
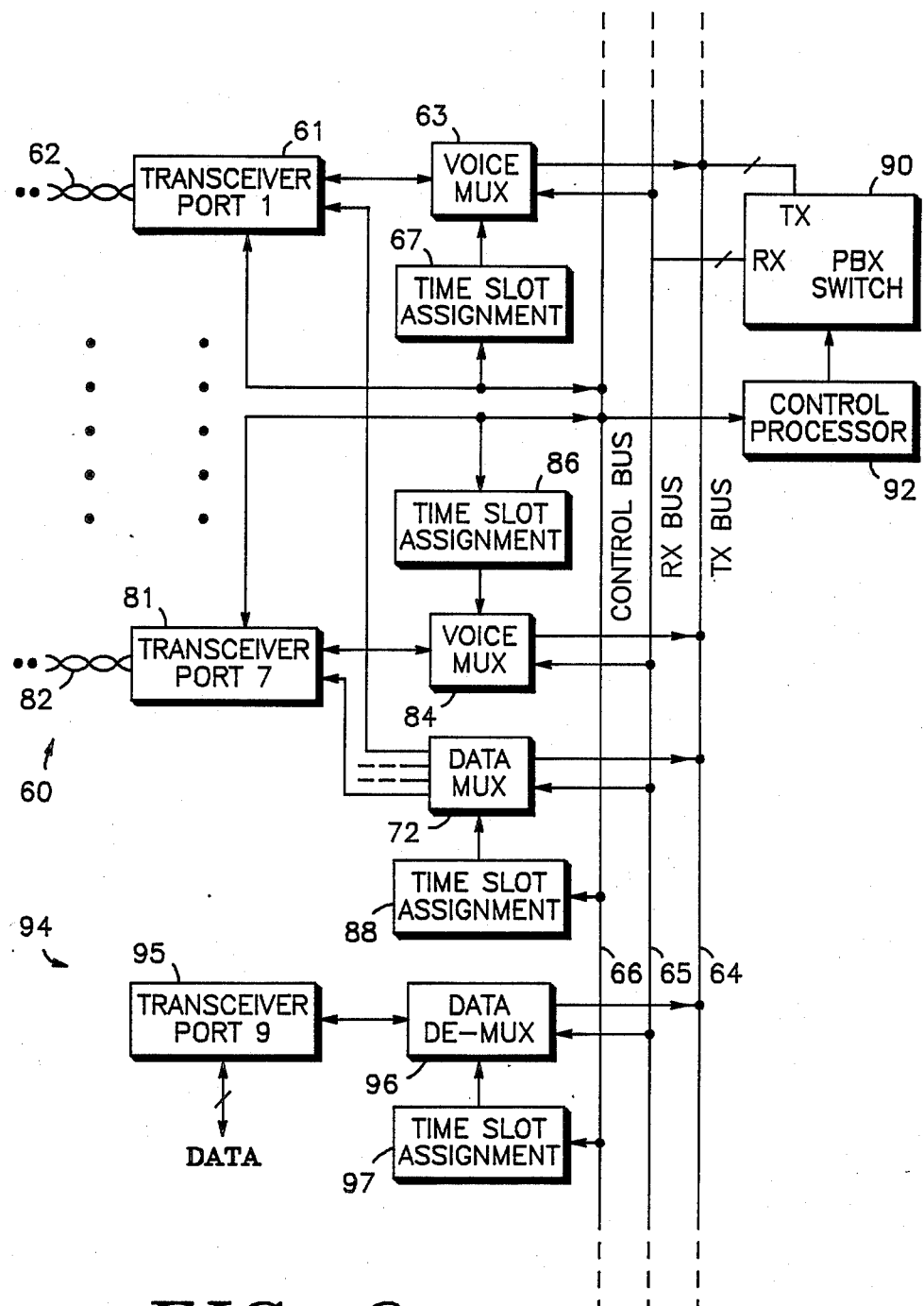
FIG. 6 illustrates in block diagram form a switch architecture interfacing with digital line cards in accordance with the present invention.

Shown in FIG. 6 is a line card 60 illustrated in accordance with the present invention. In a preferred form, operation with seven subscriber lines or seven ports as opposed to four lines in FIG. 3 are provided for 64K bits/second voice transmission and 9.6K baud user data transmission. For convenience of explanation, only a first and a seventh of seven transceiver circuits are illustrated. However, it should be well understood that the present invention may be practised by using other transmission rates and any of numerous groupings of subscriber lines. A transceiver circuit 61 is connected to a subscriber line 62. A voice terminal of transceiver 61 is connected to a first terminal of a voice multiplexer circuit 63. A second terminal of multiplexer 63 is connected to a time duplex modulated transmit bus 64. A third terminal of multiplexer 63 is connected to a time duplex modulated receive bus 65. A control bus 66 is connected to both a control terminal of transceiver 61 and to a control terminal of a time slot assignment control circuit 67. An output of time slot assignment control circuit 67 is connected to a fourth terminal of voice multiplexer 63. A data terminal of transceiver 61 is connected to a first data terminal of a data multiplexer 72. A data output of data multiplexer 72 is connected to transmit bus 64, and a data input of data multiplexer 72 is connected to receive bus 65. A transceiver circuit 81 is connected to a subscriber line 82. A voice terminal of transceiver circuit 81 is connected to a first terminal of a voice multiplexer circuit 84. A second terminal of voice multiplexer 84 is connected to time duplex modulated transmit bus 64, and a third terminal of voice multiplexer 84 is connected to receive bus 65. A time slot assignment circuit 86 has an output connected to a fourth terminal of voice multiplexer 84. Control bus 66 is connected to both a control terminal of time slot assignment circuit 86 and to a control terminal of transceiver 81. A second data terminal of data multiplexer 72 is connected to a data terminal of transceiver 81. Other data terminals are connected to intervening transceiver circuits (not shown) as indicated by the dashed lines. A time slot assignment control circuit 88 has a control input connected to control bus 66 and a control output connected to a control input of data multiplexer circuit 72. It should be readily apparent that intervening transceiver circuits illustrated by dots in FIG. 6 would each interconnect in line card 60 with buses 64, 65 and 66 and with data multiplexer circuit 72 in the same manner as transceiver circuits 61 and 81 interconnect. Each intervening transceiver circuit not shown would also require an individual voice multiplexer circuit and a time slot assignment circuit as required in the illustrated form by transceivers 61 and 81. A PBX switch 90 has a plurality of receive inputs coupled to receive bus 65 and a plurality of transmit outputs coupled to transmit bus 64. A control processor 92 has a first terminal coupled to a control terminal of PBX switch 90 and a second terminal coupled to control bus 66. A data trunk card 94 is illustrated with a transceiver 95 having a first data terminal for providing and receiving data via a multi-wire conductor. A second data terminal of transceiver 95 is coupled to a first terminal of a data demultiplexer circuit 96. Demultiplexer circuit 96 has a second terminal coupled to transmit bus 64 and a third terminal coupled to receive bus 65. A time slot assignment circuit 97 has a first terminal connected to control bus 66 and a second terminal connected to a control terminal of demultiplexer circuit 96.

In operation, voice/data line card 60 functions to provide non-blocking 64K baud voice service for seven subscriber sets while providing 9.6K baud user data service for each subscriber set. Any of the seven ports illustrated in FIG. 6 may communicate voice and data among each other via the control of switch 90 and processor 92 or with other ports of line cards not shown. Another possible communication link is a voice link between transceiver 61 and any other transceiver which switch 90 may connect and a data link between transceiver 61 and data trunk card 94. Data trunk card 94 may interface with a variety of end links not shown via transceiver 95. For example, transceiver 95 may be coupled to a host processor, a modem, a plurality of processor terminals or to additional data switches depending upon the type of communication system desired. One of the advantages of the communication system of the present invention is that any of the subscriber circuits may communicate voice and data to two different locations via a conventional PBX switch without substantially increasing the cost per subscriber line.

Figure 7:
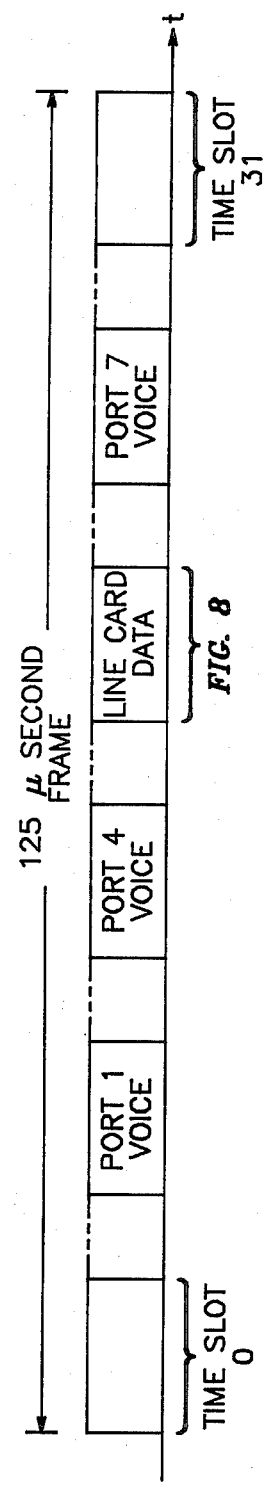
FIG. 7 illustrates in graphical form time slot assignment for the voice/data line card of FIG. 6.

Referring to FIG. 7, an alignment of thirty-two time slots per 125 usec frame which exist for the chosen 64K baud rate is shown. In every eight time slots, seven are dedicated to voice transmission from a respective one of the seven subscriber sets. A predetermined time slot of every group of eight time slots is dedicated as a line card data time slot. In this transmission scheme, each subscriber line has four dedicated time slots per frame for voice and there are four dedicated time slots for line card data.

Figure 8:
FIG. 8 illustrates in block diagram form a line card data time slot of FIG. 7.

Shown in FIG. 8 is a predetermined one of the line card data time slots. As previously mentioned, each time slot is eight bits wide illustrated as bits $b_0$ through bits $b_7$. Bit $b_0$ is a data bit from port or subscriber one. Similarly, bits $b_1$ through $b_5$ each correspond to a predetermined one of intervening ports or transceviers not expressly illustrated in FIG. 6. Data bit $b_6$ is a data bit corresponding to transceiver or port seven. Bit $b_7$ is an unused data bit. Transceiver 61 functions to both transmit and receive port one voice and data bits. Transceiver 61 selectively couples voice bits to voice multiplexer 63 in response to a control signal from control bus 66. Voice multiplexer 63 selectively couples voice bits to transmit bus 64 and selectively receives voice bits from receive bus 65 in response to a control signal provided by time slot assignment circuit 67. Transceiver 61 also selectively couples data bits to data multiplexer 72 in response to a control signal from control bus 66. Data multiplexer 72 selectively receives data bits from transceiver 61 in response to time slot assignment circuit 88 which is also controlled from control bus 66. Voice bits are also communicated between transmit and receive buses 64 and 65 and transceiver 81 via voice multiplexer 84 in an analogous manner. A data bit being transmitted or received via the pair of subscriber lines 82 is selectively received by data multiplexer 72 once every time slot under control of time slot assignment circuit 88. Components of line card 60 may be readily implemented with conventional commercially available circuits which function as transceivers, time slot assignment circuits and as multiplexers.

In the illustrated form, a method has been provided for readily adapting a conventional PBX to a PBX which provides both voice and "leased line data" or "hot-line data" without substantially increasing the cost per line service of the PBX. Further, user data service is provided to every user simultaneously with non-blocking voice service. The present invention accomplishes these stated features and only lowers the PBX user port capacity for the stated frequency from eight voice only ports to seven simultaneous voice and data ports. Further, multiplexed data from seven data ports is transmitted at a frequency of 9.6K baud which is adequately high enough for data terminal use such as word processors and various types of data work stations. Since the vast majority of conventional existing PBXs have line cards which provide either two, four or eight voice user ports, a reduction in voice channel capacity only occurs for the application of eight user ports which is reduced to seven user ports. The seven voice time slots are switched normally for voice connections whereas the eighth time slot containing data is routed to a software programmed destination such as an application host, an external network or an auxillary switch.

By now it should be apparent that a voice/data switch architecture has been taught which utilizes a method of multiplexing data with multiple voice ports in a single frame of transmission. As a result, PBX station loop bandwidth is fully utilized to provide simultaneous 64K baud voice and 9.6K baud data communication. Most importantly, the present invention may be used with an existing voice only PBX and does not significantly increase the cost per line of the PBX to attain simultaneously voice and data communication in non-blocking transmission.

While an embodiment has been disclosed using certain ssumed parameters, it should be understood that certain obvious modifications to the circuit or the given parameters will become apparent to those skilled in the art, and the scope of the invention should be limited only by the scope of the claims appended hereto.

We claim:

1. A voice/data communication system for simultaneously communicating voice and data information comprising:
    a plurality of transceiver means, each transceiver means coupled between an assigned one of a plurality of subscriber lines and a communication link comprising a transmit bus, a receive bus and a control bus, each transceiver means having a first terminal for transmitting and receiving voice information via the transmit and receive buses, respectively, and having a second terminal for simultaneously transmitting and receiving data information via the transmit and receive buses, respectively;
    a plurality of voice multiplexer means, each voice multiplexer selectively communicating voice information between a predetermined one of the transceiver means and the transmit and receive buses in predetermined time slots of a time frame;
    a data multiplexer coupled to the second terminal of each transceiver means, for selectively multiplexing data bits from two or more of the plurality of transceiver means into a single time slot of the same time frame and communicating each data bit between the transmit and receive buses and a predetermined one of the transceiver means; and
    control means coupled to the transceiver means, voice multiplexer means and data multiplexer, for controlling the transfer of voice and data information between each transceiver means and the transmit and receive buses.

2. The voice/data communication system of claim 1 wherein the data multiplexer multiplexes data bits from each of the plurality of transceiver means into the single time slot.

3. In a digital communication system having a plurality of digital transceiver circuits for selectively communicating between each of the transceiver circuits in frame format via a communication link having a transmit bus, a receive bus and a control bus, a method of switching voice and data communicated by each transceiver circuit to provide non-blocking voice communication and data communication, comprising the steps of:
    coupling each transceiver circuit between assigned one of a plurality of subscriber lines and the communication link, each transceiver circuit having a first terminal coupled to the communication link for transmitting and receiving voice information via the transmit and receive buses, respectively, and having a second terminal for simultaneously transmitting and receiving data information via the transmit and receive buses, respectively;
    selectively communicating voice information between a predetermined one of the transceiver circuits and the transmit and receive buses in predetermined time slots of a time frame;
    selectively multiplexing data bits from two or more of the plurality of transceiver circuits into a single time slot of the same time frame and communicating each data bit between the transmit and receive buses and a predetermined one of the transceiver circuits; and
    controlling the transfer of voice and data information between each transceiver circuit and the transmit and receive buses.

4. The method of claim 3 wherein data bits from each of the plurality of transceiver circuits are multiplexed into the single time slot.

* * * * *